July 7, 1942. G. E. DESROCHERS 2,288,794
VENETIAN BLIND TAPE CUTTING MACHINE
Filed July 12, 1940 7 Sheets-Sheet 1
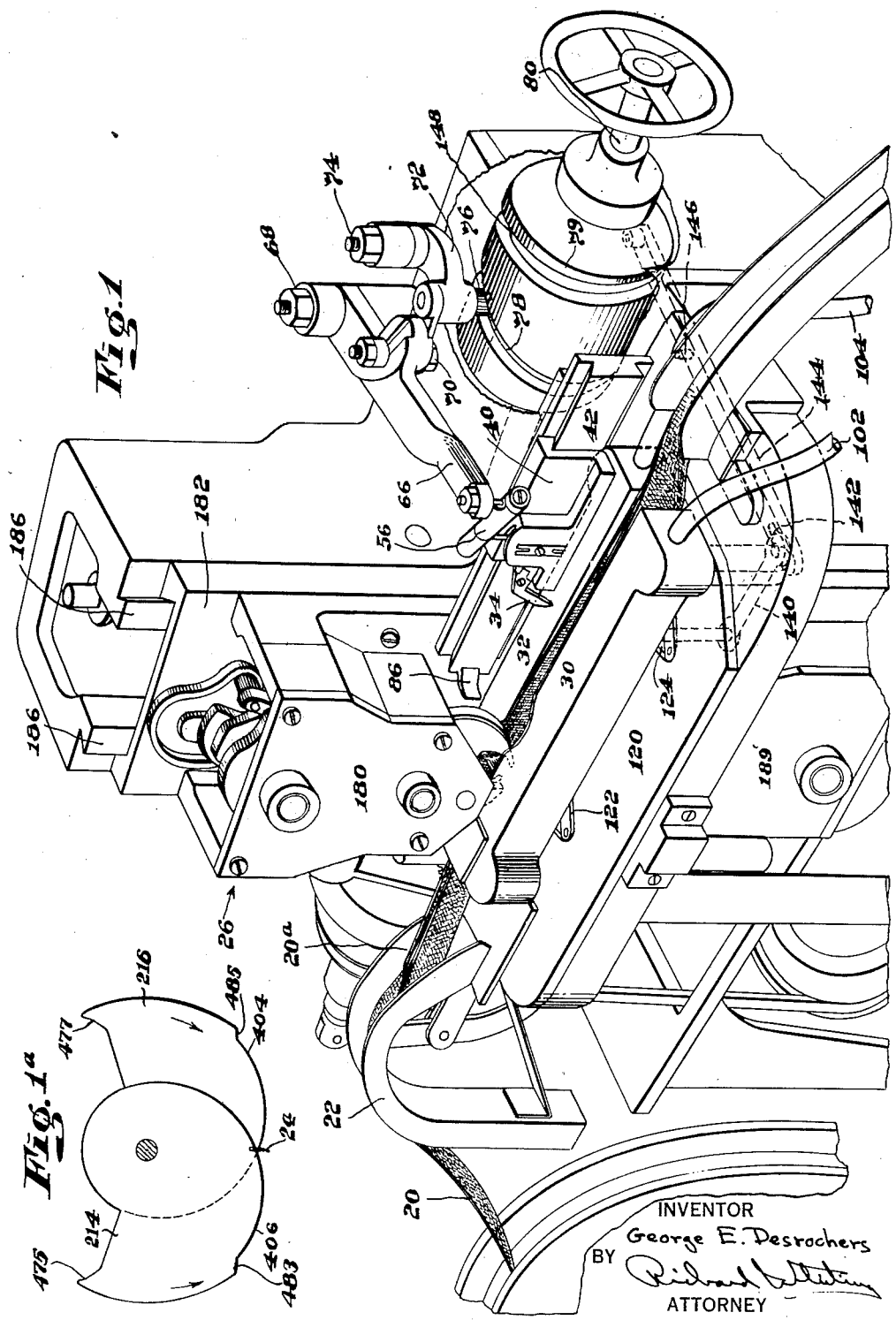
INVENTOR
George E. Desrochers
BY
ATTORNEY

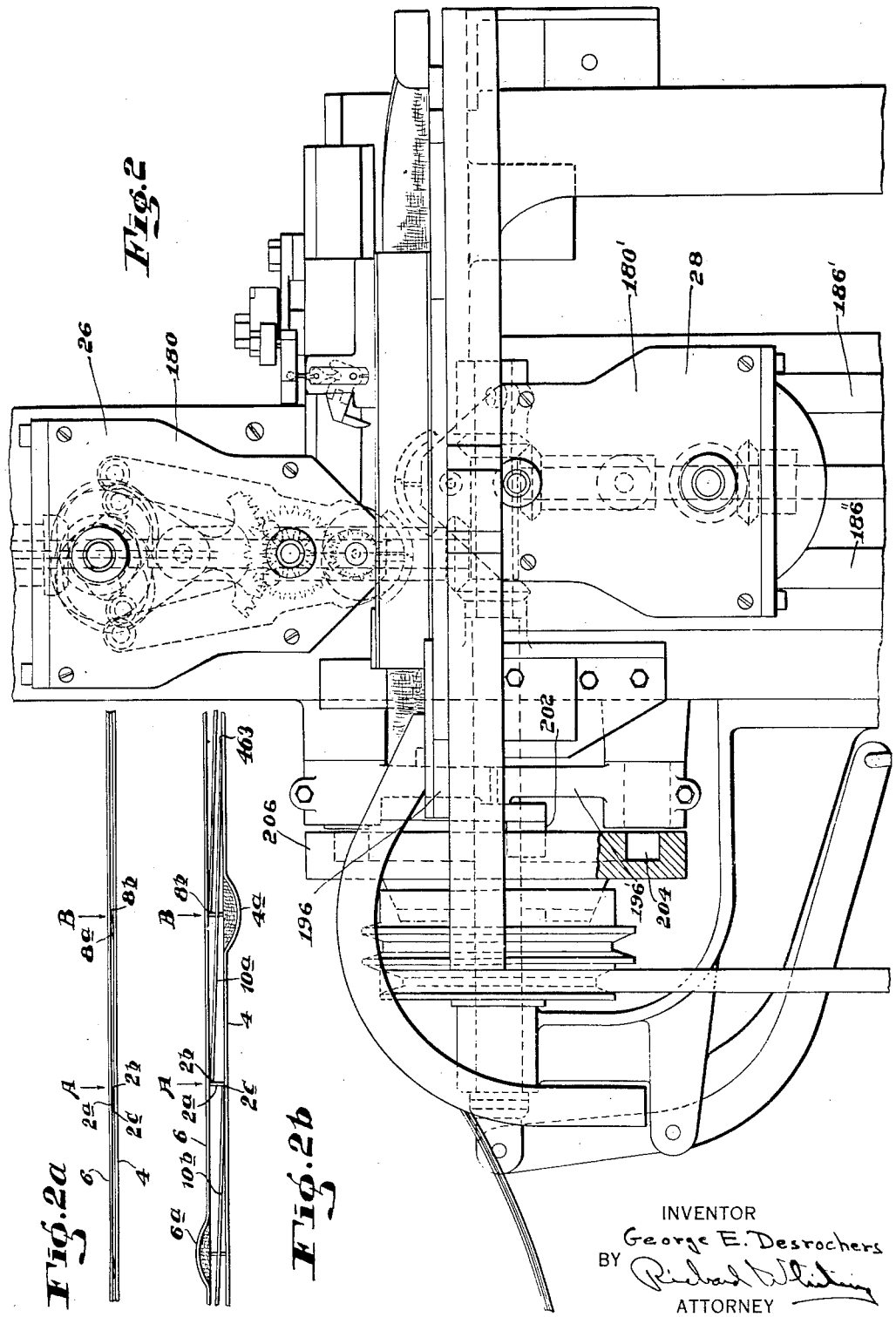

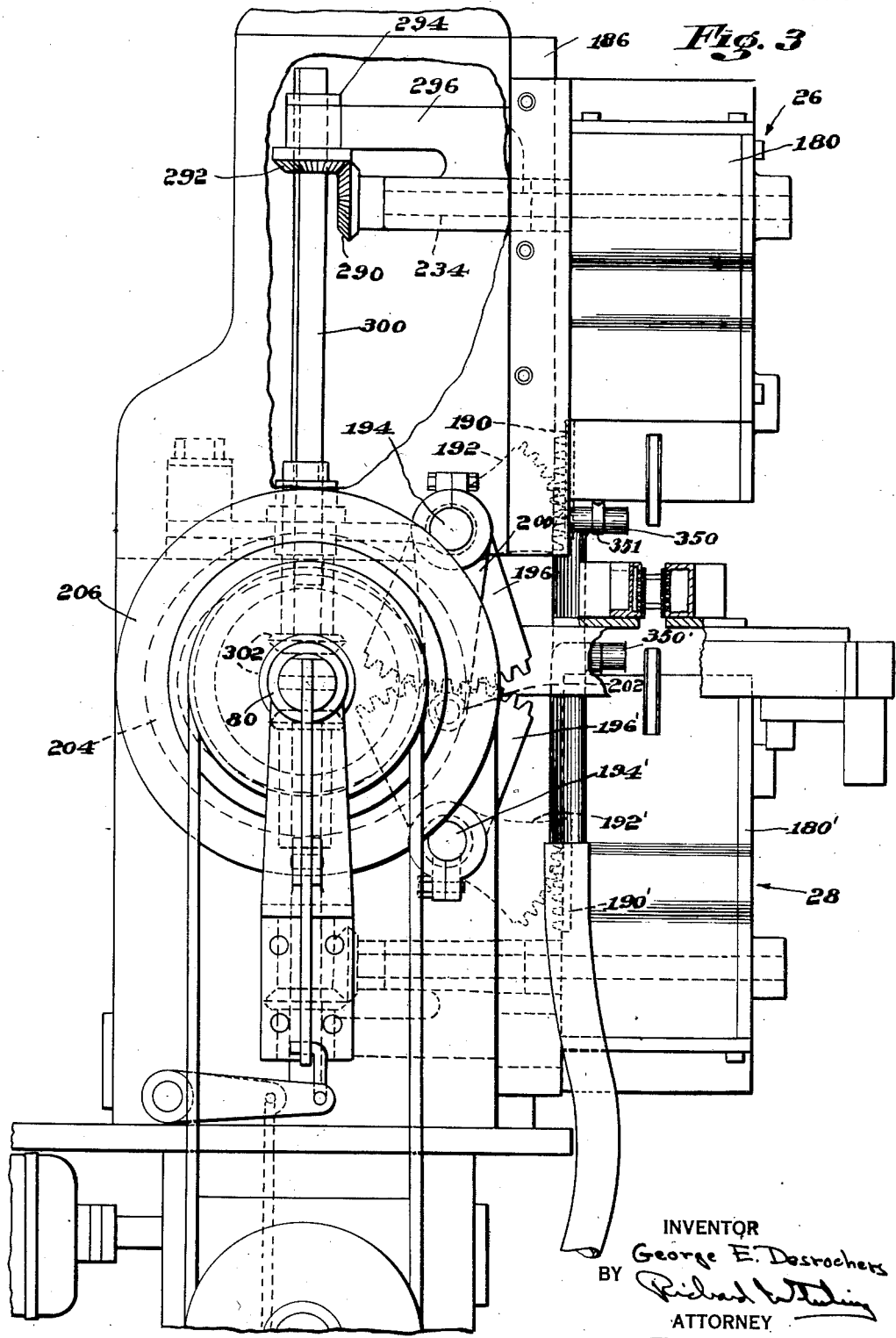

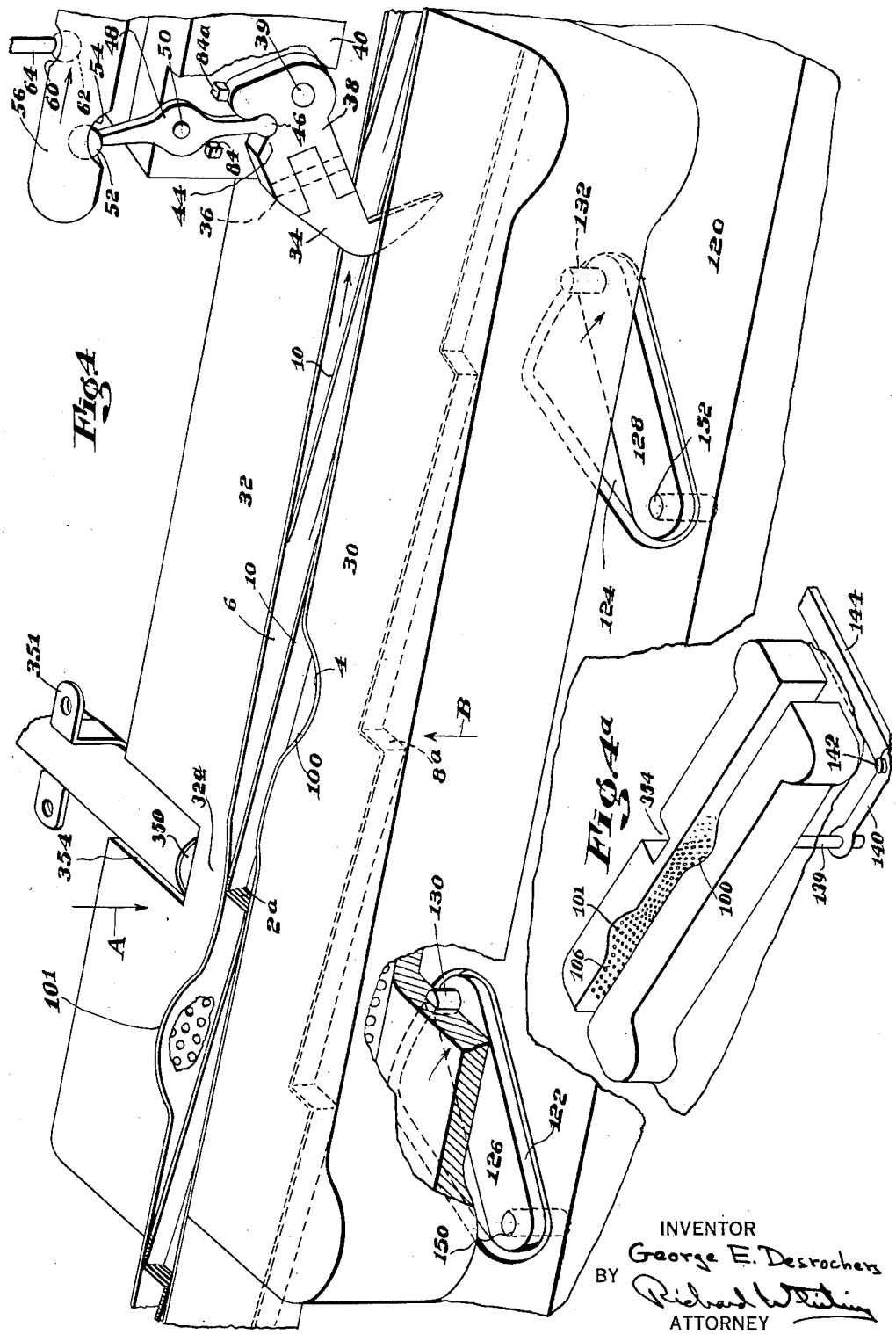

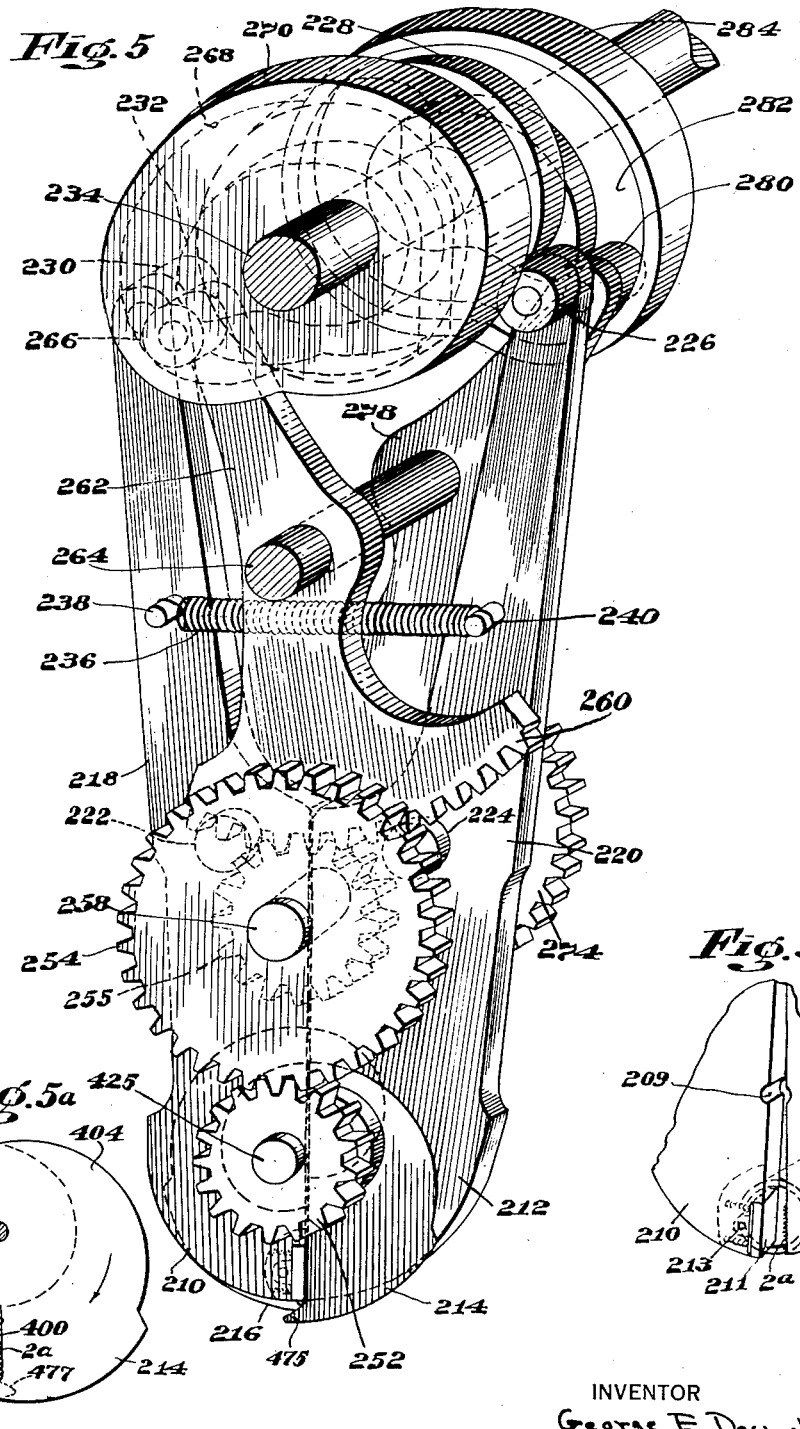

July 7, 1942.     G. E. DESROCHERS     2,288,794
VENETIAN BLIND TAPE CUTTING MACHINE
Filed July 12, 1940     7 Sheets-Sheet 6
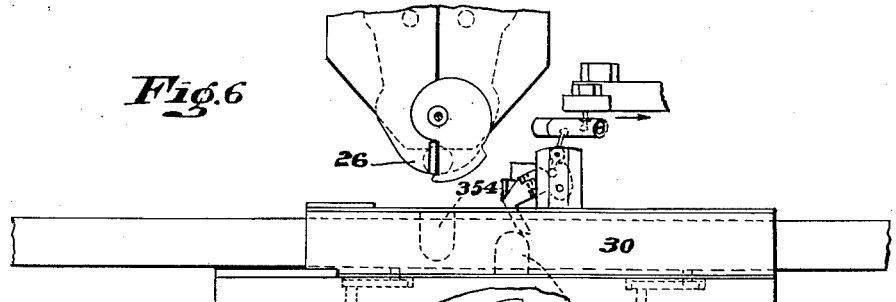
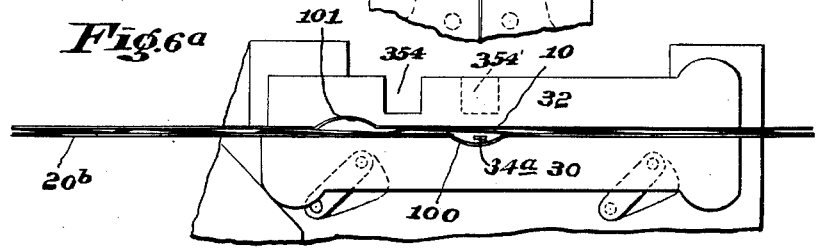
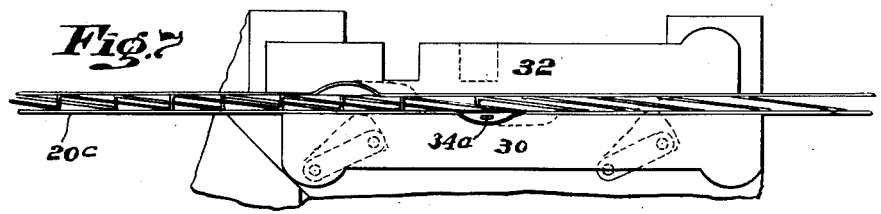
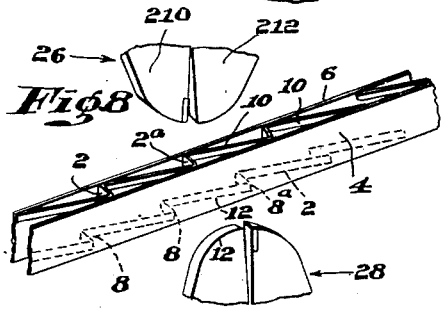
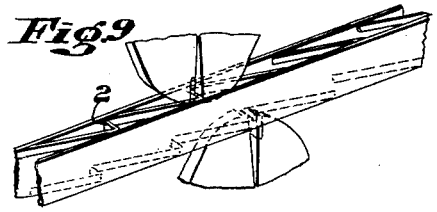
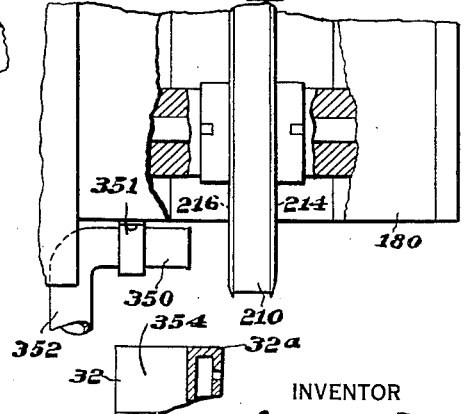
INVENTOR
George E. Desrochers
BY
ATTORNEY

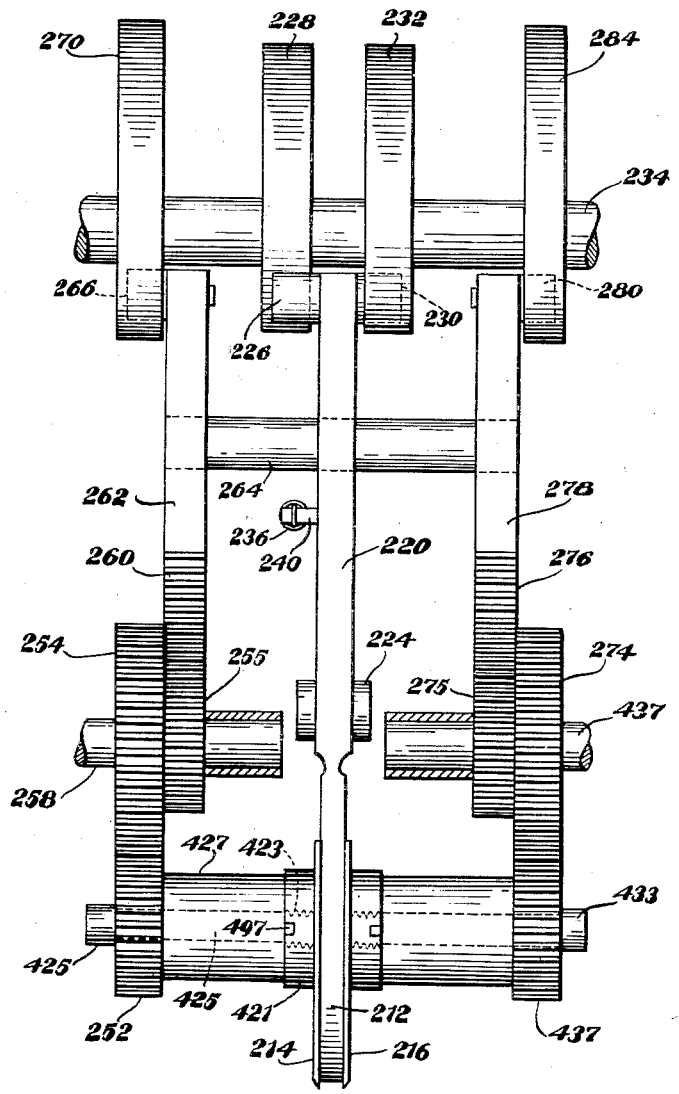

Patented July 7, 1942

2,288,794

UNITED STATES PATENT OFFICE 2,288,794

VENETIAN BLIND TAPE CUTTING MACHINE

George E. Desrochers, Lowell, Mass., assignor to Samson Cordage Works, Boston, Mass., a corporation of Massachusetts Application July 12, 1940, Serial No. 345,155

18 Claims. (Cl. 26—7)

This invention relates to apparatus for automatically cutting the crossings connecting the opposite webs of a Venetian blind ladder tape and its object is to improve on prior mechanisms of that character in the operations of feeding the tape and positioning and cutting the crossings.

In the preferred embodiment of my machine the tape is intermittently advanced and opened in a novel manner to dispose its crossings substantially normal to the opposite webs and in position to be engaged by cooperating grippers and cutters effective to cut each crossing adjacent both webs and convey it away to be disposed of.

In the drawings:

Fig. 1 is a perspective view of my machine as seen from the front;

Fig. 1a is a diagrammatic view showing the cut being made;

Fig. 2 is a front elevation view;

Figs. 2a and 2b are diagrammatic views showing the opening of the tape;

Fig. 3 is an end elevation view of the machine as seen from the left of Fig. 1;

Fig. 4 is a perspective view of the suction box openers and the tape advancing mechanism;

Fig. 4a is a perspective view of the suction box openers indicating the perforate face of one of the boxes;

Fig. 5 is a perspective view of one pair of grippers and cutters;

Fig. 5a is a detail of the cutter blades;

Fig. 5b is a detail of a pair of grippers;

Figs. 6 and 6a are diagrammatic elevation and plan views respectively showing the parts at the beginning of the tape feeding operation;

Fig. 7 is a plan view similar to Fig. 6a but showing the tape opening action of the suction boxes;

Fig. 8 is a perspective view showing the grippers approaching the tape, the cutters being eliminated for clarity of illustration;

Fig. 9 is a view like Fig. 8 but showing the grippers received between the tape webs;

Fig. 10 is a detail side elevation view, with parts broken away, showing the upper grippers and knives; and Fig. 11 is an elevation view of the parts shown in Fig. 5, as viewed from the right.

As is known in the art, the opposite webs 4 and 6 (Fig. 8) of a Venetian blind ladder tape are connected during the weaving by warp floats 2 and 8 disposed at regular intervals adjacent the upper and lower edges respectively of the webs and with the lower crossings 8 alternating with the upper crossings and usually midway between them. Both sets of crossings must be cut to permit separation of the webs 4 and 6 so that the ladders 10 are fully extended perpendicularly to both webs and adapted to support the blind slats.

In my preferred machine (Fig. 1) the tape 20 to be cut is drawn from a supply, not shown, over the guide 22 adapted to turn the tape from a horizontal to a vertical position, indicated at 20a, as it enters the machine. While the tape is thus vertically disposed and after it has been opened while it pauses between the suction boxes 30 and 32 in a manner to be described, an upper crossing 2 and the lower crossing 8 immediately to the right of it, indicated at 2a and 8a in Fig. 8, are simultaneously gripped and cut out by upper and lower gripping and cutting assemblies indicated generally at 26 and 28. After the completion of one pair of cuts the tape is advanced a distance to dispose the next succeeding pair of upper and lower crossings in position for engagement respectively by the members 26 and 28.

The tape is intermittently advanced by a feed finger 34, shown enlarged in Fig. 4, pivotally mounted at 36 to a lever 38 pivoted at 39 to a reciprocating carriage 40 slidably mounted for reciprocation on the track 42 (Fig. 1). The lever 38 is recessed at 44 to receive the spherical end 46 of a lever 48 pivoted at 50 to the carriage 40. The upper end of lever 48 is also provided with a spherical end 52 received in an aperture 54 in an arm 56 also apertured at 60 to receive the ball end 62 of a post 64 projecting downwardly from the end of a lever 66 (Fig. 1). The lever 66 is pivoted at 68 to the frame of the machine and is pivoted at 70 to the end of a lever 72 pivoted at 74 to the frame. The lever 72 has a cam follower 76 received in a cam groove 78 of a cam 79 mounted on shaft 80 which is driven from a suitable source of power not shown.

As the cam 79 rotates, lever 66 is caused to oscillate about its pivot 68 with a predetermined amplitude which can be adjusted by regulating the position of the pivot 70 and is properly adjusted to feed the tape, of whatever size, a predetermined distance equal to the spacings between successive pairs of crossings as above indicated.

As the lever 66 moves to the left, as viewed in Fig. 1, it pushes the arm 56 to the left, urging lever 48 counterclockwise about pivot 50 to swing the finger 34 upwardly out of the tape until the finger engages stop 84 projecting from carriage 40. Further movement of lever 66 to the left advances the carriage along the track 42 and this movement continues until the limit of its stroke. As the lever 66 then commences its movement to the right, it pulls on the arm 56, thereby rotating lever 48 clockwise about pivot 50 until stop 84a is abutted by lever 33, causing the finger 34 to drop down between the opposite webs 4 and 6 of the tape. The slide then moves to the right, as viewed in Fig. 1, so that finger 34 engages the crotch between ladder 10 and the web 4 (Fig. 4), thereby feeding the tape to the right through the predetermined distance above noted. Fig. 4 shows the finger in its position at the end of the feeding stroke.

To insure that the finger enters between the webs on that side of the ladder 10 facing the web 4, I provide a camming projection 86 (Fig. 1) which the finger engages at the end of its inward stroke and by which it is turned slightly about its vertical pivot 36 toward the web 4.

At 30 and 32 I have shown a pair of suction boxes which are hollowed out and are connected by tubes 102 and 104 (Fig. 1) to suitable apparatus, not shown, for withdrawing air from them. The inner opposed faces of both boxes are provided with perforations, as shown at 106, (Fig. 4a) so that when air is withdrawn through the tubes 102 and 104, the webs of the tape are caused by suction to adhere to the faces of the boxes. While the webs are thus adhered to the box faces, the boxes move to open the tape as will be described, and to accommodate a certain bulging of the webs during this opening movement, the opposed box faces are recessed at 100 and 101. The recess 100 is positioned to retract the web at the locality where the finger 34 enters as shown at 34a in Fig. 7.

The back box 32 is fixedly mounted on the frame of the machine and the front box is slidably mounted on the platform 120 for movement between its position shown in Fig. 6a to that shown in Fig. 7. The platform 120 is recessed at 122 and 124 (Fig. 4) to countersink levers 126 and 128 pivoted at 150 and 152 respectively. These levers carry pins 130 and 132 respectively on their forward ends which are received in recesses in the bottom of box 30. The box 30 is connected by post 139 (Fig. 4a) to link 140 connected at 142 to a lever 144 pivoted at 146 (Fig. 1) to the frame and having its other end carrying a cam follower engaging the groove 148 in cam 79. As the cam 79 rotates, lever 144 swings about pivot 146 to urge box 30 to the right or to the left as viewed in Fig. 1, in an arcuate path controlled by a parallel movement of levers 126 and 128 about their pivots 150 and 152. This separates the webs for the reception of the grippers and cutters 26 and 28 which now enter the tape along center lines shown by arrows A and B in Fig. 4.

The upper and lower grippers and cutters are in all respects identical in their construction and operation and I will accordingly confine myself to a description of the upper one, like parts in the lower assembly being designated by the primes of the numbers used in describing the upper one.

The assembly 26 is enclosed in a box housing 180 (Figs. 1, 2 and 3) closed by a back plate 182 which is mounted for vertical sliding movement on the tongue and groove slides 186 formed on the frame. To effect simultaneous vertical movement of the housings which carry the upper and lower assemblies, the housings have fixed to them racks 190, 190' (Fig. 3) engaged by pinion sectors 192, 192' fixed to shafts 194, 194' connected for simultaneous movement by intermeshing gear sectors 196 and 196'. The shaft 194 is rotated by crank 200 fixed to it and having a cam follower 202 received in a groove 204 formed on the inner face of cam 206. The cam is fixed to the aforesaid shaft 80, continuously driven while the machine is operating, and the resultant movement of crank 200 fixed to shaft 194 moves the assemblies 26 and 28 from the retracting positions of Fig. 8 to the positions of Fig. 9 where the crossings are embraced and cut.

Each of the assemblies includes a pair of cooperating grippers 210 and 212 (Figs. 5 and 5b) having a rotating knife 214 disposed in front of the grippers and a second rotating knife 216 disposed in back of them (see also Fig. 11). The gripper 210 has a gripping plate 211, pivotally mounted at 213 and spring pressed as shown to grip yieldingly the crossing 2a against the opposed face of gripper 212.

The grippers 210 and 212 are formed on the ends of levers 218 and 220 mounted on pivots 222 and 224, respectively, suitably mounted in lugs (not shown) protruding from the housing. To open and close the grippers at the proper time, the upper end of lever 220 carries a cam follower 226 riding on a cam 228 and the upper end of lever 218 carries a similar cam follower 230 riding on cam 232. The cams 228 and 232 are fixed to cam shaft 234 rotated in a manner to be described. The cam followers are pressed against their cams by means of the spring 236 extending between studs 238 and 240 projecting from the levers 218 and 220.

The knife 214 has secured to it a collar 421 screw-threaded internally at 423 to mate with a screw-thread on the end of stud shaft 425, to which collar 421 is pinned against rotation by pin 497. Shaft 425 is mounted in bearing 427, suitably supported by the housing, and has pinion 252 fixed to it. Knife 216 is similarly mounted on the end of a shaft 433 rotated by pinion 437 fixed to it.

Pinion 252 meshes with a gear 254 fixed to shaft 258, supported by the housing, which also has fixed to it a pinion 255 which meshes with a gear sector 260 formed on the lower end of a crank 262 rotatably mounted on shaft 264 carried by the housing. The upper end of crank 262 has a cam follower 266 received in a groove 268 of cam 270.

Similarly, pinion 437 which rotates the back knife 216 meshes with gear 274 fixed to shaft 437 rotated by pinion 275 meshing with gear sector 276 on a crank 278 mounted on shaft 264 and having a follower 280 received in the groove 282 of cam 284.

The cam shaft 234 projects through the back wall of the housing 180 (Fig. 3) and carries fixed to its extremity a bevel gear 290 meshing with the bevel gear 292 carried by a collar 294 having bearings in a bracket 296 fixed to the housing 180. The collar 294 is splined to a vertical shaft 300 connected by bevel gears 302 to shaft 80 continuously rotated as above described. By this construction shaft 234 is continuously rotated by gear 292 which also slides vertically lengthwise of shaft 300.

Mounted in depending position from the bottom of assembly housing 180 by means of bracket 351 is a suction tube 350 (Fig. 10) presenting a suction opening spaced slightly to the rear of the back knife 216 and in proximity to the gripping portions of the jaws 210 and 212, as shown in Fig. 5b. The tube 350 is connected to a rubber tubing 352 communicating with a suction pump not shown. The tube 350 being fixed to the housing moves vertically with it. The rear suction box 32 is formed with a recessed portion 354 shown best in Figs. 4 and 4a so that when the grippers 210 and 212 and the knives 214 and 216 dip into the space between the open boxes, as indicated in Fig. 9, the tube 350 is accommodated by the recess. Air is continuously being withdrawn through the tube 350 by the suction source and when the tube is received within the recess 354 the narrowed portion 32a of the front wall of the box 32 acts to shield the grippers from the suction in the opening and may function as a valve to interrupt the suction of air into tube 350.

Similarly, a suction tube 350' (Fig. 3) secured to the upper surface of housing 180' is in position to present a source of suction in proximity to the lower gripper jaws and the tube 350' moves vertically with the housing 180'. To accommodate the tube 350' when the lower grippers and knives are between the suction boxes 30 and 32, the rear box has a second recessed portion 354' (Figs. 6 and 6a) which functions to shield the lower grippers from the suction opening in the lower tube 350'.

With the machine constructed as above described its operation is as follows:

While the boxes 30 and 32 are in their open positions of Figs. 4 and 7, the feed finger 34 advances to its forward position where it engages camming surface 86 and is deflected sidewardly as it drops down between the webs to the position indicated at 34a in Fig. 7. The finger starts to retract through the action of cam groove 78 on the follower of lever 72 until it engages the crotch between ladder 10 and web 4, when feed of the tape commences. Immediately prior to the feed, box 30 moves to the closed position of Fig. 6a. The tape is then fed to a position in which (Figs. 2a and 2b) the leading end 2b of the crossing 2a is directly in alignment with the plane of the faces of the upper grippers when subsequently closed, as indicated by the arrow A, and the leading end 8b of the under crossing is in alignment with the grip of the lower grippers indicated by the arrow B. The feed finger 34 then comes to rest in its position of Fig. 4.

Preferably at the end of this feeding motion, cam groove 148 (Fig. 1) actuates the follower on the end of lever 144 to move box 30 from its Fig. 6a to its Fig. 7 position to open the webs. Since the webs 4 and 6 adhere to the opposed faces of the boxes 30 and 32 during this movement, the web 4 moves away from the web 6 in a path governed by the lengths of the cranks 126 and 128 and which preferably is such as to rotate the crossings 2a and 8a about their ends 2b and 8b as centers to dispose them in a position normal to both webs and in alignment with the arrows A and B. Bulges of material are formed in the webs 4 and 6 during this opening movement, due to the fact that the ladders 10, which are of a fixed predetermined length, are secured to them. Thus when end 2b of crossing 2a remains stationary while end 2d moves to the right ladder 10b also moves to the right, causing web 6 to bulge as shown at 6a. Furthermore, although that portion of web 4 adjacent end 2c of the crossing moves to the right, that portion of web 4 joined to ladder 10a at 463 is prevented from moving because ladder 10a does not move in any substantial amount, thus bulging the web 4 at 4a. By drawing these bulges into the recesses 100 and 101 of the boxes 30 and 32 through the action of the suction, I insure against accumulation of web material adjacent the crossings where it might interfere with entry of the grippers and knives between the webs.

After the tape webs have thus been separated from each other as widely as the crossings 2 and 8 will permit, the upper and lower grippers and cutters move into the space between the tapes along the center lines of the arrows A and B as above described, effected by the action of cam groove 204 on cam follower 202 (Fig. 3).

The grippers 210 and 212 then start to close through the action of cams 232 and 228 (Fig. 5). Immediately before the grippers close completely on the crossings disposed between them, the knife cams 268 and 282 rotate the knives in directions, shown by arrows in Fig. 5a, contrary to the directions of cut to bring the knives to rest in the positions there shown, where the vertical blunt edge 400 of knife blade 214 abuts one side of the crossings and the vertical blunt edge 402 of the knife 216 abuts the other side. The purpose of this operation is to insure proper positioning of the crossings between the opposed jaws of the grippers immediately before the grippers close on the crossings. The protruding noses 475 and 477 just pass each other as shown and are effective to gather up into the space between edges 400 and 402 any drooping threads of the crossing. This movement of the knives also insures proper positioning of the crossings lengthwise thereof, so that when the knives reverse for the cutting stroke the cuts will be properly made through the crossings closely adjacent both webs without cutting the webs.

The closing of the grippers is then completed, after which knife 214 rotates counterclockwise and rear knife 216 rotates clockwise (Fig. 1a) to sever the crossing immediately adjacent the webs 4 and 6 respectively. This severing is effected by the helical cutting edges 404 and 406 of the blades 214 and 216 respectively. The abrupt cutting edges 483 and 485 insure cutting of any drooping threads not brought up between the grippers by noses 475 and 477.

After the crossings have thus been cut the blades retract and while the grippers are still closed on the cut-out crossings the grippers retract out of the webs by elevation of the upper housing 180 and lowering of the bottom housing 180'.

After the grippers have been retracted sufficiently to draw their suction tubes 350 and 350' out of the openings 354 and 354' respectively, in the back box 32, the grippers open. The suction in the tubes 350 and 350' is effective to withdraw the cut-out cross threads from the grippers and convey them away to be disposed of.

The feed finger advances, the front box closes on the back box, and the cycle is repeated. By closing the boxes immediately prior to the commencement of tape feed, I eliminate the bulges 4a and 6a which might interfere with such feeding.

For adapting the machine to different sized tapes, the stroke of the feed finger is adjusted as above described. In an obvious manner the lower housing 180' which encloses the mechanism for cutting the lower crossings 8 is adjustable in position lengthwise of the web feed to accommodate different spacings between the crossings 2a and 8a which are simultaneously cut.

The preferred embodiment of my invention, which has been described above in considerable detail, can be variously modified to suit the needs of individual users, and my invention is to be limited only as required by the appended claims.

I claim:

1. In a machine for cutting the crossings connecting the webs of Venetian blind tape, the combination of means for cutting out a crossing by severing it at each end thereof, and means for removing and disposing of the cut out crossing.

2. In a machine for cutting the crossings connecting the webs of Venetian blind tape, the combination of a pair of cutters and means for moving the cutters relative to the webs for positioning the cutters at opposite ends of the crossing adjacent the webs to sever a crossing adjacent both webs at substantially the same time.

3. In a machine for cutting the crossings connecting the webs of Venetian blind tape, the combination of a pair of cutters, means for moving the cutters relative to the webs to position the cutters for severing a crossing adjacent both webs at substantially the same time, means for actuating the cutters when so positioned, and means for removing and disposing of the cut out crossing.

4. In a machine for cutting the crossings connecting the webs of Venetian blind tape, the combination of a pair of grippers for gripping a crossing intermediate the opposite webs, and a pair of knives, one disposed on each side of the grippers and adapted to cut a gripped crossing adjacent both webs.

5. In a machine for cutting the crossings connecting the webs of Venetian blind tape, the combination of a pair of grippers for gripping a crossing intermediate the opposite webs, a pair of knives, one disposed on each side of the grippers, adapted to cut a gripped crossing adjacent both webs, means for moving the grippers relatively to the webs to position the grippers between the webs for gripping a crossing prior to the cutting, and means for removing the grippers from between the webs after the cut to dispose of the cut out crossing.

6. In a machine for cutting the crossings connecting the webs of Venetian blind tape, the combination of a pair of grippers for gripping a crossing intermediate the opposite webs, a pair of knives, one disposed on each side of the grippers and adapted to cut a gripped crossing adjacent both webs, means for moving the gripper relative to the webs to position the grippers between the webs, means for thereafter closing the grippers for gripping a crossing prior to the cutting, means for removing the grippers from between the webs after the cut and while still closed on the cut out crossing, and means for thereafter opening the grippers to dispose of the cut out crossing.

7. In a machine for cutting the crossings connecting the webs of Venetian blind tape, the combination of a pair of web openers engaging the opposite webs and movable apart to open the tape, a pair of cutters, and means for moving the cutters between the webs after they are opened to position the cutters for cutting out a crossing by severing it adjacent both webs at substantially the same time.

8. In a machine for cutting the crossings connecting the webs of Venetian blind tape, the combination of a pair of web openers engaging the opposite webs and movable apart to open the tape, a pair of cutters, means for moving the cutters between the webs after they are opened by said openers to position the cutters for cutting out a crossing by severing it adjacent both webs at substantially the same time, and means for removing and disposing of the cut out crossing.

9. In a machine for cutting the crossings connecting the webs of Venetian blind tape, the combination of a pair of web openers engaging the opposite webs and movable apart to open the tape, knives for cutting the crossings, means for advancing the tape, while closed, into position to receive the knives, means for inserting the knives between the webs when said webs are so opened, and means for removing and disposing of the cut out crossings.

10. In a machine for cutting the crossings connecting the webs of Venetian blind tape, the combination of grippers for gripping the crossings, means for moving the grippers from retracted position into position for gripping the crossings intermediate the webs, means for closing the grippers when in gripping position and means for opening the grippers when in retracted position, and pneumatic means adapted to dispose of cut out crossings released by the opening of the grippers in retracted position.

11. In a machine for cutting the crossings connecting the webs of Venetian blind tape, the combination of grippers for gripping the crossings intermediate the webs, knives carried on opposite sides of the grippers adapted to cut a gripped crossing by severing it adjacent both webs, and means carried by the knives adapted to abut and position the crossings relative to the grippers immediately prior to closing of the grippers.

12. In a machine for cutting the crossings connecting the webs of Venetian blind tape, the combination of grippers for gripping the crossings intermediate the webs, a pair of rotary knives, one mounted on each side of the grippers, adapted to cut the crossing adjacent both webs when the knives rotate in a predetermined direction, and an abutment on each knife adapted, upon a reverse rotation of the knife prior to closing of the grippers, to engage and position the crossings for closure of the grippers.

13. In a machine for cutting the crossings connecting the webs of Venetian blind tape, the combination of opposed suction members facing the outer surfaces of the webs and having means for drawing air through them to effect adherence of the webs thereto, means for moving the suction members apart to separate the webs, and means for cutting the crossings bridging the separated webs.

14. In a machine for cutting the crossings connecting the webs of Venetian blind tape, the combination of a pair of opposed suction members facing the outer surfaces of the webs and having means for drawing air through them to effect adherence of the webs thereto, means for moving one member away from the other member and longitudinally thereof to separate the webs while moving one web lengthwise of the other, whereby to extend a crossing in a direction substantially normal to both webs, and means for cutting the crossing so positioned.

15. In a machine for cutting the crossings connecting the webs of Venetian blind tape, the combination of a pair of web openers engaging the opposite webs and movable apart to open the tape, a pair of grippers adapted to be closed on a crossing intermediate the opposite webs to grip the crossing, a knife disposed on each side of the grippers adapted to cut a gripped crossing adjacent both webs, means for moving the grippers and knives relative to the webs to position the grippers and knives between the webs so opened with a crossing received by the open grippers, means for closing the grippers on the crossing, means for thereafter operating said knives to cut the crossing so gripped and means for removing the closed grippers from between the webs after the cut to remove the cut out crossing.

16. A machine for cutting the crossings connecting the webs of Venetian blind tape, as defined in claim 15, which includes means for drawing outwardly of the tape the bulges formed in its opposite webs by opening the tape.

17. In a machine for cutting the crossings connecting the webs of Venetian blind tape, the combination of opposed suction boxes having faces adapted to abut the outer surfaces of the web and having means for drawing air through them to effect adherence of the web thereto, means for moving one of the boxes away from the other and longitudinally thereof to separate the webs while moving one web lengthwise of the other to extend a crossing in a direction substantially normal to both webs, each of said faces having a recess into which the bulge formed in the adjacent web by opening the webs is drawn by said suction, and means for cutting the crossing so positioned.

18. In a machine for cutting the crossings connecting the webs of Venetian blind tape, the combination of grippers for gripping the crossings intermediate the webs, a pair of rotary knives, one mounted on each side of the grippers, adapted to cut a gripped crossing in close proximity to both webs when the knives rotate in a predetermined direction, an abutment on each knife adapted, upon a reverse rotation of the knife prior to closing of the grippers, to engage and position a crossing for closure of the grippers, the said abutment including a protruding portion which gathers up drooping threads of the crossing, and the cutting edges of the said knives having protruding portions which effect cutting of said drooping threads.

GEORGE E. DESROCHERS.